US009180972B2

(12) United States Patent
Meis et al.

(10) Patent No.: US 9,180,972 B2
(45) Date of Patent: Nov. 10, 2015

(54) SUPERCOOLED LARGE DROP ICING CONDITION DETECTION SYSTEM

(75) Inventors: Charles Steven Meis, Renton, WA (US); Cris Kevin Bosetti, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 713 days.

(21) Appl. No.: 13/414,894

(22) Filed: Mar. 8, 2012

(65) Prior Publication Data

US 2013/0175397 A1    Jul. 11, 2013

Related U.S. Application Data

(63) Continuation-in-part of application No. 13/344,144, filed on Jan. 5, 2012.

(51) Int. Cl.
*G08B 19/02* (2006.01)
*B64D 15/20* (2006.01)
*B64D 15/22* (2006.01)
B64D 15/00 (2006.01)
B64D 45/00 (2006.01)
B64F 5/00 (2006.01)

(52) U.S. Cl.
CPC ............... *B64D 15/20* (2013.01); *B64D 15/22* (2013.01); *B64D 15/00* (2013.01); *B64D 45/00* (2013.01); *B64F 5/0054* (2013.01)

(58) Field of Classification Search
CPC ...... B64F 5/0054; B64D 15/00; B64D 15/20; B64D 15/22; B64D 45/00
USPC .......................................................... 340/580
See application file for complete search history.

(56) References Cited

U.S. PATENT DOCUMENTS

| 5,248,116 | A | 9/1993 | Rauckhorst |
| 5,354,015 | A | 10/1994 | Meador |
| 5,474,261 | A | 12/1995 | Stolarczyk et al. |
| 5,484,121 | A * | 1/1996 | Padawer et al. ............ 244/134 F |
| 6,166,661 | A * | 12/2000 | Anderson et al. ............. 340/962 |
| 6,269,320 | B1 * | 7/2001 | Otto ............................... 702/127 |
| 6,347,767 | B1 * | 2/2002 | Holmen ..................... 244/134 F |
| 6,731,225 | B2 | 5/2004 | Vopat |

(Continued)

FOREIGN PATENT DOCUMENTS

EP    1254833 A1    6/2002

OTHER PUBLICATIONS

"FAA Inflight Aircraft Icing Plan," United States Department of Transportation Federal Aviation Administration, Apr. 1977, 60 pp.

(Continued)

*Primary Examiner* — Kerri McNally
*Assistant Examiner* — Naomi Small
(74) *Attorney, Agent, or Firm* — Yee & Associates, P.C.

(57) ABSTRACT

A method and apparatus for an ice detection system. The ice detection system includes a first sensor located on a leading edge of a vertical stabilizer on an aircraft, a second sensor located on a first side of the vertical stabilizer, and a third sensor located on a second side of the vertical stabilizer. The first sensor is configured to detect a first type of icing condition for the aircraft. The second sensor is configured to detect a second type of icing condition for the aircraft. The third sensor is configured to detect the second type of icing condition for the aircraft.

20 Claims, 10 Drawing Sheets

(56) References Cited

U.S. PATENT DOCUMENTS

| | | | |
|---|---|---|---|
| 6,759,962 B2* | 7/2004 | Severson et al. | 340/580 |
| 7,586,419 B2 | 9/2009 | Ikiades | |
| 8,144,325 B2 | 3/2012 | Ray et al. | |
| 8,200,451 B2 | 6/2012 | Battisti | |
| 8,325,338 B1* | 12/2012 | Pope et al. | 356/301 |
| 2002/0158768 A1* | 10/2002 | Severson et al. | 340/581 |
| 2004/0206854 A1 | 10/2004 | Shah et al. | |
| 2007/0216536 A1 | 9/2007 | Alfano et al. | |
| 2008/0128556 A1 | 6/2008 | Platt | |
| 2008/0167764 A1 | 7/2008 | Flemming | |
| 2010/0123044 A1* | 5/2010 | Botura | 244/134 D |
| 2011/0147526 A1* | 6/2011 | Bellussi et al. | 244/134 F |
| 2012/0085868 A1* | 4/2012 | Barnes | 244/134 F |
| 2013/0113926 A1 | 5/2013 | Chen et al. | |

OTHER PUBLICATIONS

"CFR NPRM," Federal Register, vol. 75, No. 124, Jun. 2010, pp. 37311-37339.

Related U.S. Appl. No. 13/344,144, filed Jan. 5, 2012, 45 Pages.

PCT search report dated Mar. 6, 2013 regarding application PCT/US2012/066515, filed Nov. 26, 2012, applicant The Boeing Company, 12 pages.

Office action dated Jan. 29, 2014 regarding U.S. Appl. No. 13/344,144, 19 pages.

Final Office action dated Apr. 24, 2014 regarding U.S. Appl. No. 13/344,144, 10 pages.

Notice of Allowance dated Aug. 4, 2014 regarding U.S. Appl. No. 13/344,144, 9 pages.

\* cited by examiner

SUPERCOOLED LARGE DROP ICING CONDITION DETECTION SYSTEM

CROSS-REFERENCE TO RELATED APPLICATION

This application is a continuation-in-part of U.S. patent application Ser. No. 13/344,144, filed Jan. 5, 2012, entitled "Supercooled Large Drop Icing Condition Detection System", which is incorporated herein by reference.

BACKGROUND INFORMATION

1. Field

The present disclosure relates generally to detecting icing conditions and, in particular, to icing conditions for an aircraft. Still more particularly, the present disclosure relates to detecting supercooled water drops, including supercooled large drops (SLD).

2. Background

In aviation, icing on an aircraft may occur when the atmospheric conditions lead to the formation of ice on the surfaces of the aircraft. Further, this ice also may occur within the engine. Ice forming on the surfaces of the aircraft, on inlets of an engine, and other locations are undesirable and potentially unsafe for operating the aircraft.

Icing conditions may occur when drops of supercooled liquid water are present. In these illustrative examples, water is considered to be supercooled when the water is cooled below the stated freezing point for water but is still in a liquid form. Icing conditions may be characterized by the size of the drops, the liquid water content, air temperature, and other parameters. These parameters may affect the rate and extent at which ice forms on an aircraft.

When icing occurs, the aircraft does not operate as desired. For example, ice on the wing of an aircraft will cause the aircraft to stall at a lower angle of attack and have an increased drag.

Aircraft may have mechanisms to prevent icing, remove ice, or some combination thereof to handle these icing conditions. For example, aircraft may include icing detection, prevention, and removal systems. Ice may be removed using deicing fluid, infrared heating, and other suitable mechanisms.

Aircraft may be certified for operating during different types of icing conditions. Some aircraft may be certified to operate in normal icing conditions but not those that include supercooled large drops. Currently used sensors are unable to differentiate between normal and supercooled large drop icing conditions. Therefore, it would be desirable to have a method and apparatus that takes into account one or more of the issues discussed above as well as possibly other issues.

SUMMARY

In one illustrative embodiment, an ice detection system comprises a first sensor located on a leading edge of a vertical stabilizer on an aircraft, a second sensor located on a first side of the vertical stabilizer, and a third sensor located on a second side of the vertical stabilizer. The first sensor is configured to detect a first type of icing condition for the aircraft. The second sensor is configured to detect a second type of icing condition for the aircraft. The third sensor is configured to detect the second type of icing condition for the aircraft.

In another illustrative embodiment, an ice detection system comprises a first sensor located on a leading edge of a vertical stabilizer on an aircraft, a second sensor located on a first side of the vertical stabilizer, a third sensor located on a second side of the vertical stabilizer, and a processor unit. The first sensor is in a first location configured to detect a normal icing condition for the aircraft. The second sensor is in a second location configured to detect a supercooled large drop type of icing condition for the aircraft. The second side is opposite of the first side. The third sensor is in a third location configured to detect a supercooled large drop type of icing condition for the aircraft. The processor unit is configured to monitor data from the first sensor, the second sensor, and the third sensor. The processor unit is further configured to perform an action in response to the data indicating a presence of at least one of the normal icing condition and the supercooled large drop type of icing condition.

In yet another illustrative embodiment, a method for detecting icing conditions is present. A first sensor located on a leading edge of a vertical stabilizer on an aircraft is monitored for first data indicating a first type of icing condition for the aircraft. A second sensor located on a first side of the vertical stabilizer and a third sensor located on a second side of the vertical stabilizer are monitored for second data indicating a second type of icing condition for the aircraft. An action is initiated in response to detecting at least one of the first type of icing condition from the first data and the second type of icing condition from the second data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a number of different considerations. For example, the different illustrative embodiments recognize and take into account that currently used systems for detecting icing conditions on an aircraft are unable to detect all of the different types of icing conditions that may occur. For example, the different illustrative embodiments recognize and take into account that as the size of the drops of water increases, currently used sensors may not detect icing caused by those drops of water. The different illustrative embodiments recognize and take into account that the locations at which different sizes of drops will collide with an airfoil during operation of an aircraft change, depending on the size of the drops.

The illustrative embodiments recognize and take into account that it is desirable to detect different types of icing conditions that may be caused by different sizes of drops of water. In particular, the illustrative embodiments recognize and take into account that it may be desirable to detect drops of supercooled liquid water. These drops may take the form of supercooled large drops.

Thus, one or more illustrative embodiments provide a method and apparatus for detecting ice. In one illustrative embodiment, an ice detection system comprises a first sensor, a second sensor, and a third sensor. The first sensor is located on a leading edge of a vertical stabilizer on an aircraft. The first sensor is configured to detect a first type of icing condition for the aircraft.

A second sensor is located on a first side of the vertical stabilizer. The second sensor is configured to detect a second type of icing condition for the aircraft. A third sensor is located on a second side of the vertical stabilizer. The third sensor is configured to detect the second type of icing condition for the aircraft. These two types of icing conditions are examples of icing conditions that may occur in different locations on the aircraft.

Figure 1:
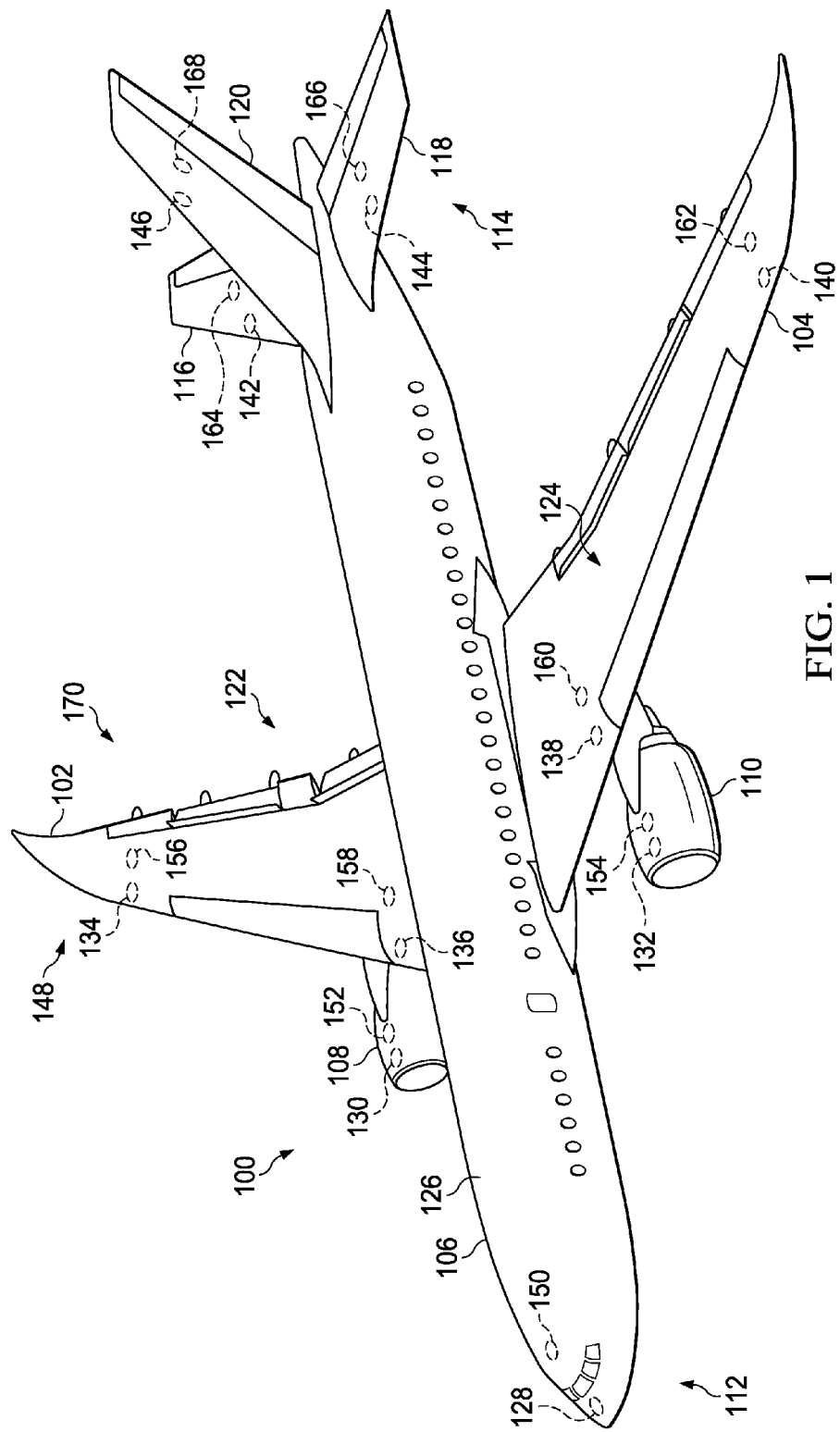
FIG. 1 is an illustration of an aircraft in accordance with an illustrative embodiment.

With reference now to the figures and, in particular, with reference to FIG. 1, an illustration of an aircraft is depicted in accordance with an illustrative embodiment. In this illustrative example, aircraft 100 has wing 102 and wing 104 attached to fuselage 106. Aircraft 100 also includes engine 108 attached to wing 102 and engine 110 attached to wing 104.

Fuselage 106 has nose section 112 and tail section 114. Nose section 112 is the forward part of aircraft 100, while tail section 114 is the aft part of aircraft 100. Horizontal stabilizer 116, horizontal stabilizer 118, and vertical stabilizer 120 are attached to tail section 114 of fuselage 106.

Aircraft 100 is an example of an aircraft in which ice detection system 122 may be implemented in accordance with an illustrative embodiment. In these illustrative examples, ice detection system 122 comprises sensors 124 on surface 126 of aircraft 100. As depicted, sensors 124 include sensors 128, 130, 132, 134, 136, 138, 140, 142, 144, and 146. These sensors form first group of sensors 148 in sensors 124 for ice detection system 122.

Additionally, sensors 124 also include sensors 150, 152, 154, 156, 158, 160, 162, 164, 166, and 168. These sensors form second group of sensors 170 in sensors 124 for ice detection system 122. In the illustrative examples, sensors 124 may detect when ice is formed on the sensors.

As depicted, first group of sensors 148 is in a first group of locations on surface 126 of aircraft 100. First group of sensors 148 is configured to detect a first type of icing condition for aircraft 100. Second group of sensors 170 is in a second group of locations on surface 126 of aircraft 100. Second group of sensors 170 in the second locations is configured to detect a second type of icing condition for aircraft 100.

In these illustrative examples, these icing conditions may occur at different altitudes and temperatures that cause the formation of ice on aircraft 100. For example, icing conditions may be present at an altitude from about sea level to about 30,000 feet when the temperature is from about −40 degrees Celsius to about zero degrees Celsius. Of course, other altitudes and temperatures may be present at which ice may be formed from water that contacts surface 126 of aircraft 100. Icing conditions also may be present when the liquid water content in the drops is from about 0.4 to about 2.8 grams/cubic meter at the altitude and temperature range described above.

As depicted, the first type of icing condition and the second type of icing condition are caused by drops of water of different sizes. Although the altitude, temperature, and liquid water content ranges may be the same, one difference between the first and second types of icing conditions is the drop size.

In these illustrative examples, the first type of icing condition may be present when the size of the drops is from about 0.00465 millimeters in diameter to about 0.111 millimeters in diameter. Drops with these sizes may be referred to as normal drops. The second type of icing condition may be present when the size of the drops includes drops that have a diameter greater than about 0.111 millimeters. Drops having a size greater than about 0.111 millimeters may be referred to as large drops and, in particular, may be called supercooled large drops under the altitude, temperature, and liquid water content conditions described above. For example, the drops may have a diameter with a range from about 0.112 millimeters to about 2.2 millimeters. In addition, the second type of icing condition may include drops that are about 0.111 millimeters or less when drops greater than about 0.111 millimeters are present.

As depicted, first group of sensors 148 in the first group of locations may be configured to detect ice formed by drops of water in a first number of sizes. Second group of sensors 170 in the second group of locations is configured to detect ice formed by drops of water having a second number of sizes. In these illustrative examples, the first number of sizes is smaller than the second number of sizes.

For example, the first number of sizes may be from about 0.00465 millimeters in diameter to about 0.111 millimeters in diameter. The second number of sizes may be from about 0.112 millimeters to about 2.2 millimeters in diameter.

The second number of sizes of the drops of water may be drops of water that are considered to be drops of supercooled water. These drops of supercooled water may be supercooled large drops (SLD). First group of sensors 148 is configured to detect drops of water that are not supercooled large drops in these illustrative examples. The type of icing condition detected by sensors 124 is based on the locations for sensors 124 on surface 126 of aircraft 100 in these illustrative examples.

In the illustrative examples, the first type of icing condition may be referred to as a normal icing condition. The second type of icing condition may be referred to as a supercooled large drop icing condition.

In these illustrative examples, sensors 124 are depicted as flush-mounted sensors. In other words, sensors 124 are substantially flush or planar with surface 126 of aircraft 100. Sensors 124 may be implemented using all of the same type of sensors or different types of sensors. Further, other numbers of sensors 124 and locations of sensors 124 may be used in addition to or in place of those illustrated for aircraft 100 in FIG. 1.

Although particular conditions and sizes for drops have been described for the first icing condition and the second icing condition, the different illustrative embodiments are not limited to the conditions and sizes depicted. For example, other altitudes and drop sizes may be used to define when drops of water are present for the first icing condition and the second icing condition.

However, while FIG. 1 illustrates embodiments using a twin-engine aircraft, the illustrative embodiments recognize and take into account that the information contained is also applicable to aircraft with different numbers of engines. Further, the illustrative example depicts aircraft 100 as a commercial aircraft. The different illustrative embodiments may be applied to other types of aircraft, such as military aircraft.

Figure 2:
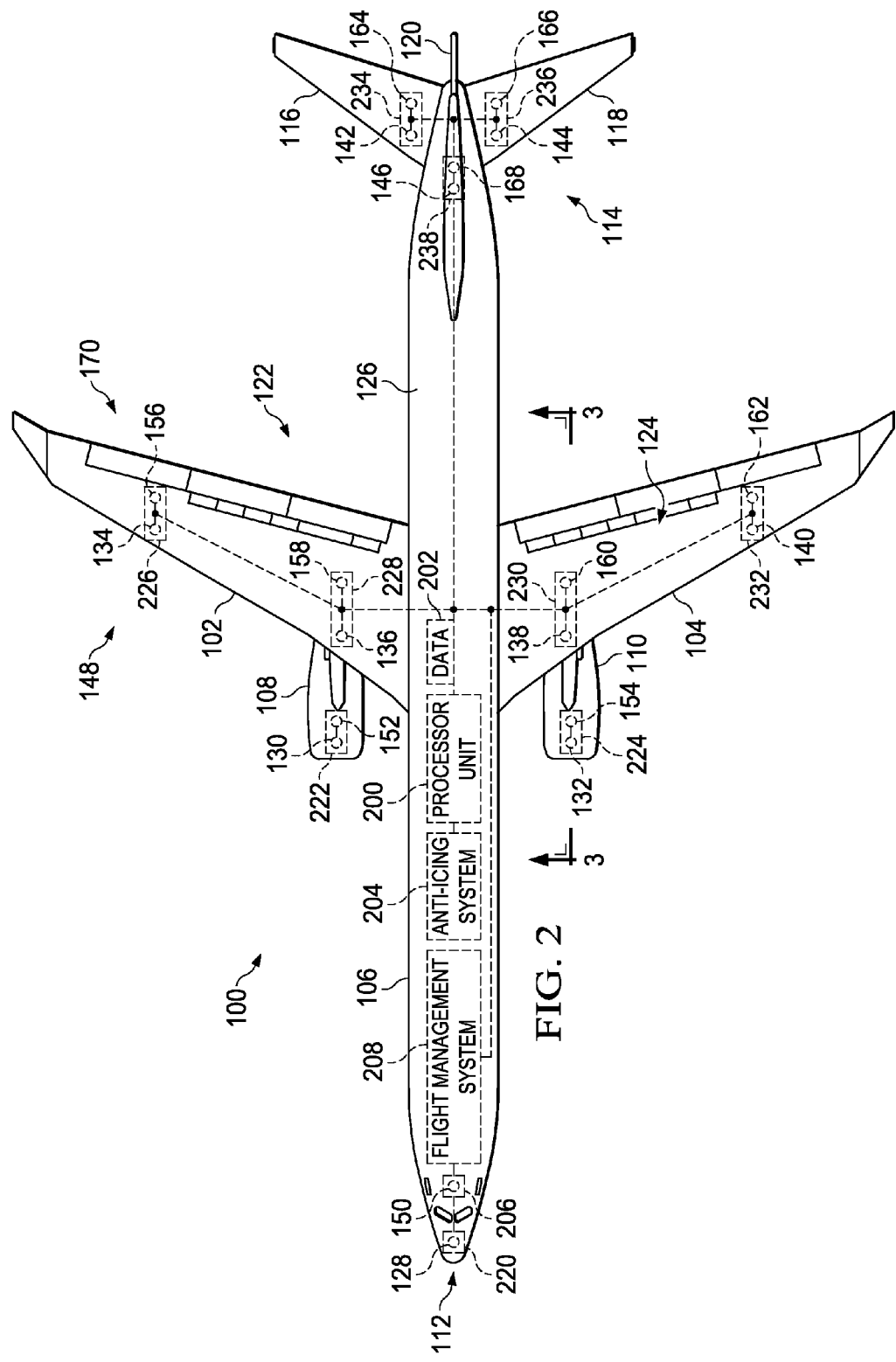
FIG. 2 is an illustration of components in an ice detection system in accordance with an illustrative embodiment.

With reference now to FIG. 2, an illustration of components in an ice detection system is depicted in accordance with an illustrative embodiment. In this illustrative example, ice detection system 122 further comprises processor unit 200. Processor unit 200 is a hardware device configured to perform operations with respect to detecting icing conditions for aircraft 100. These operations may be implemented in software, hardware, or a combination of the two.

As illustrated, processor unit 200 is connected to sensors 124. In these illustrative examples, sensors 124 generate data 202. Data 202 may indicate whether sensors 124 detect the formation of ice on surface 126 of aircraft 100. Ice is detected by sensors 124 when ice forms on one or more of sensors 124. Sensors 124 send data 202 to processor unit 200.

In these illustrative examples, processor unit 200 is configured to monitor the data from first group of sensors 148 and second group of sensors 170. Further, processor unit 200 is configured to perform an action in response to the data indicating a presence of one of the icing conditions. The particular type of icing condition detected depends on which group of sensors generating data indicates a presence of ice. In other words, the first icing condition, the second icing condition, or both the first icing condition and the second icing condition may be present, depending on the data generated by sensors 124.

The action may include at least one of generating an alert, generating a log entry, activating anti-icing system 204, sending a report, and other suitable actions. As used herein, the phrase "at least one of", when used with a list of items, means different combinations of one or more of the listed items may be used and only one of each item in the list may be needed. For example, "at least one of item A, item B, and item C" may include, without limitation, item A, or item A and item B. This example also may include item A, item B, and item C, or item B and item C.

In these illustrative examples, the alert may be generated on flight deck interface 206 for aircraft 100. Flight deck interface 206 is a display system located in the flight deck of aircraft 100. The display system comprises a number of displays on which information may be displayed to operators. These displays are hardware devices in the illustrative examples.

As used herein, a "number", when used with reference to items, means one or more items. For example, "a number of displays" is one or more displays. The number of displays may include, for example, without limitation, a primary flight display, a navigation display, and other suitable types of displays.

Further, the log entry may be generated in flight management system 208. Flight management system 208 is a computer system in aircraft 100. This computer system may be comprised of a number of computers. When more than one computer is present in the computer system, those computers may be in communication with each other using a communications media, such as a local area network.

Processor unit 200 may send a report to flight management system 208. Alternatively, the report may be sent to a remote location in addition to or in place of sending the report to flight management system 208. In these illustrative examples, the report may include an indication of what type of icing condition or conditions is present. This report also may include a location of the sensor or sensors detecting the icing condition.

Another action that processor unit 200 may take is to initiate the operation of anti-icing system 204. Anti-icing system 204 may be implemented using any currently available anti-icing system. Anti-icing system 204 may employ different types of mechanisms to remove or prevent the formation of ice on surface 126 of aircraft 100. For example, anti-icing system 204 may employ mechanical systems, chemical systems, infrared heating systems, and other types of systems to remove ice, prevent the formation of ice, or both on surface 126 of aircraft 100.

In these illustrative examples, sensors 124 may be configured in ice detection assemblies. For example, sensors 124 may be grouped as ice detection assemblies 220, 222, 224, 226, 228, 230, 232, 234, 236, and 238. Each sensor in an ice detection assembly may be configured to detect a particular type of icing condition. This type of grouping of sensors 124 may be used in selecting locations for sensors 124. Of course, in some illustrative examples, sensors 124 may not be grouped in ice detection assemblies.

Figure 3:
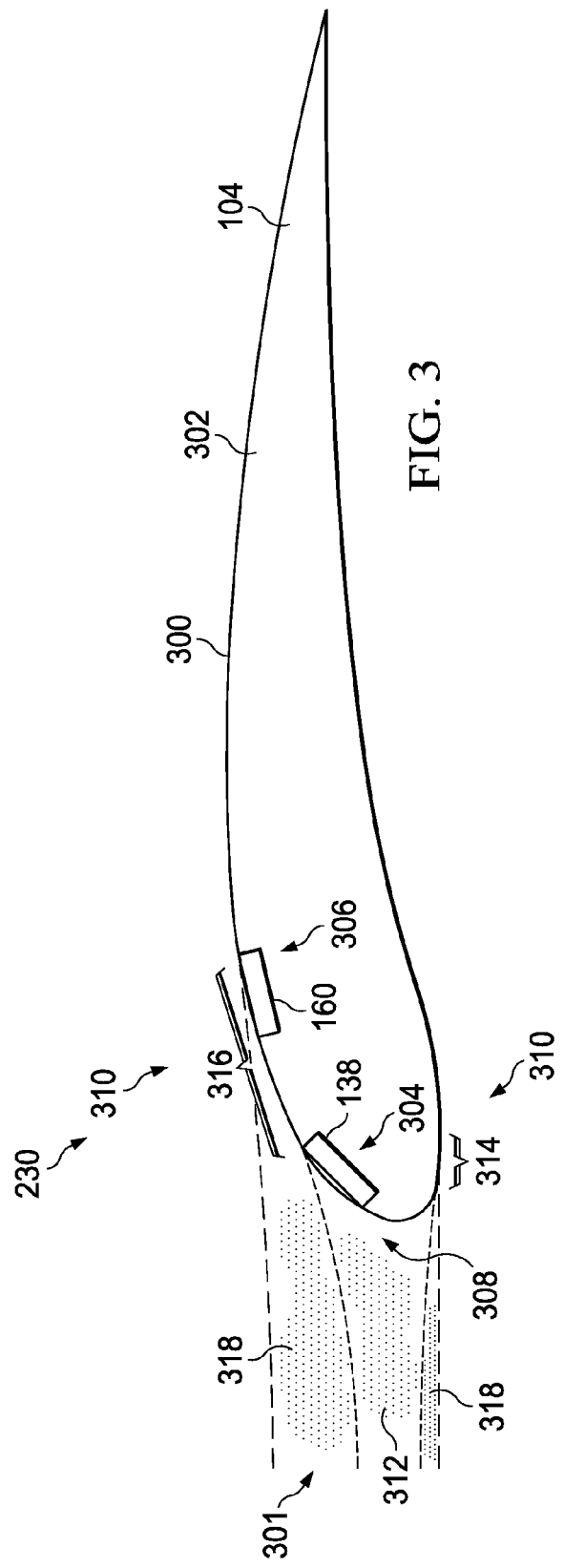
FIG. 3 is an illustration of an airfoil in accordance with an illustrative embodiment.

With reference now to FIG. 3, an illustration of an airfoil is depicted in accordance with an illustrative embodiment. In this illustrative example, airfoil 300 is wing 104 seen taken along lines 3-3 in FIG. 2. A flow of drops 301 with respect to airfoil 300 is illustrated. Locations where drops 301 collide with surface 302 are depicted in this illustrative example.

As depicted, sensor 138 and sensor 160 may be configured as ice detection assembly 230 on surface 302. In this illustrative example, sensor 138 is a first sensor located in first location 304, while sensor 160 is a second sensor located in second location 306.

In these illustrative examples, first location 304 is located in first region 308, and second location 306 is located in second region 310. As depicted, first region 308 is further forward on airfoil 300 than second region 310.

In these illustrative examples, first region 308 is comprised of a number of locations. This number of locations may be contiguous or non-contiguous with each other, depending on the particular implementation. In this example, these locations are all contiguous. First region 308 is a region in which first drops 312 collide with surface 302 of airfoil 300 for aircraft 100 in FIG. 1.

Second region 310 is also a number of locations that may be contiguous or non-contiguous with each other. In this example, these locations are non-contiguous. For example, a first portion of the number of locations may be in section 314, while a second portion of the number of locations may be in section 316. Second region 310 is a region in which second drops 318 collide with surface 302 of airfoil 300 for aircraft 100. First drops 312 collide with surface 302 in first region 308 when a first type of icing condition is present. Second drops 318 collide with surface 302 in second region 310 when a second type of icing condition is present.

In these illustrative examples, sensor 138 in first location 304 is configured to detect the formation of ice when a first type of icing condition is present, while sensor 160 in second location 306 is configured to detect the formation of ice when a second type of icing condition is present. In some cases, both types of icing conditions may be present at the same time.

In these illustrative examples, first drops 312 and second drops 318 are supercooled drops of water. These drops of water may be rain drops. The drops may have sizes ranging from about 0.00465 millimeters to about 2.2 millimeters in average diameter.

In these illustrative examples, normal drops are drops of water typically with sizes less than about 0.111 millimeters in average diameter. These drops may freeze when colliding with first region 308 of surface 302 of airfoil 300. Drops of water in freezing drizzle drops may have a diameter that is less than about 0.5 millimeters. These drops may freeze when colliding with second region 310 of surface 302 of airfoil 300. Drops of freezing rain may have a diameter that is up to about 2.2 millimeters. These drops may freeze when colliding even further aft on second region 310 of surface 302 of airfoil 300.

In these illustrative examples, freezing drizzle is drizzle that may freeze on contact with surface 302 of airfoil 300. Freezing drizzle may have a diameter that is less than about 0.5 millimeters. Freezing rain is rain that may freeze when colliding with surface 302 of airfoil 300 and may have a diameter that is up to about 2.2 millimeters.

Drops of water may be supercooled in various environments, such as in stratiform and cumulous clouds. However, supercooled large drops typically only form in cumulous clouds.

In these illustrative examples, first drops 312 may be, for example, normal supercooled drops. Normal supercooled drops are drops of supercooled water that may have a diameter from about 0.00465 millimeters to about 0.111 millimeters. As depicted, second drops 318 may be supercooled large drops. These drops may have a diameter with a size from about 0.112 millimeters to about 2.2 millimeters.

In these illustrative examples, the different sizes between first drops 312 and second drops 318 result in first drops 312 and second drops 318 colliding with surface 302 of airfoil 300 in different locations. In these illustrative examples, the locations for the different drops are defined by first region 308 and second region 310.

As a result, placement of sensor 138 is selected such that sensor 138 will detect a first type of icing condition caused by first drops 312. Sensor 160 is in second location 306 and is configured to detect a second type of icing condition caused by second drops 318 in these illustrative examples. In other words, the placement of sensor 138 and sensor 160 on surface 302 of airfoil 300 may be selected to detect different types of icing conditions. The location selected may depend on the configuration of airfoil 300.

The illustrations of aircraft 100 with ice detection system 122 in FIGS. 1-3 are not meant to imply physical or architectural limitations to the manner in which an illustrative embodiment may be implemented. Other components in addition to and/or in place of the ones illustrated may be used. Some components may be unnecessary in some illustrative embodiments. Also, some components are shown in physical implementations, while other components are shown as blocks. Blocks are presented to illustrate some functional components. One or more of the blocks illustrated may be combined, divided, or combined and divided into different blocks when implemented in an illustrative embodiment.

For example, aircraft 100 is shown in the form of an airplane. Of course, aircraft 100 may take other forms. For example, without limitation, aircraft 100 also may take the form of a helicopter. Also, although aircraft 100 is illustrated as a commercial aircraft, the different illustrative embodiments may be applied to military aircraft and other types of aircraft, depending on the particular implementation. For example, aircraft 100 also may be applied to an aircraft that may fly in the air as well as enter outer space, although icing conditions do not exist at altitudes that are considered outer space.

In still another illustrative example, although sensors 124 are shown as grouped into ice detection assemblies, other illustrative embodiments may not employ ice detection assemblies. In other words, groupings of sensors into assemblies may not be used, depending on the particular implementation. In some illustrative examples, processor unit 200 may be considered part of flight management system 208 instead of a separate component in the illustrative examples.

Further, other numbers of sensors may be used other than those illustrated for aircraft 100. The number of sensors used may depend on the particular type of aircraft. For example, the number of sensors and their locations may change, depending on the size and configuration of airfoils on aircraft 100. In still other illustrative examples, the sensors may all be the same type of sensors or different types of sensors. For example, sensors 124 may be implemented using a sensor configured to detect a presence or formation of ice in these illustrative examples.

Figure 4:
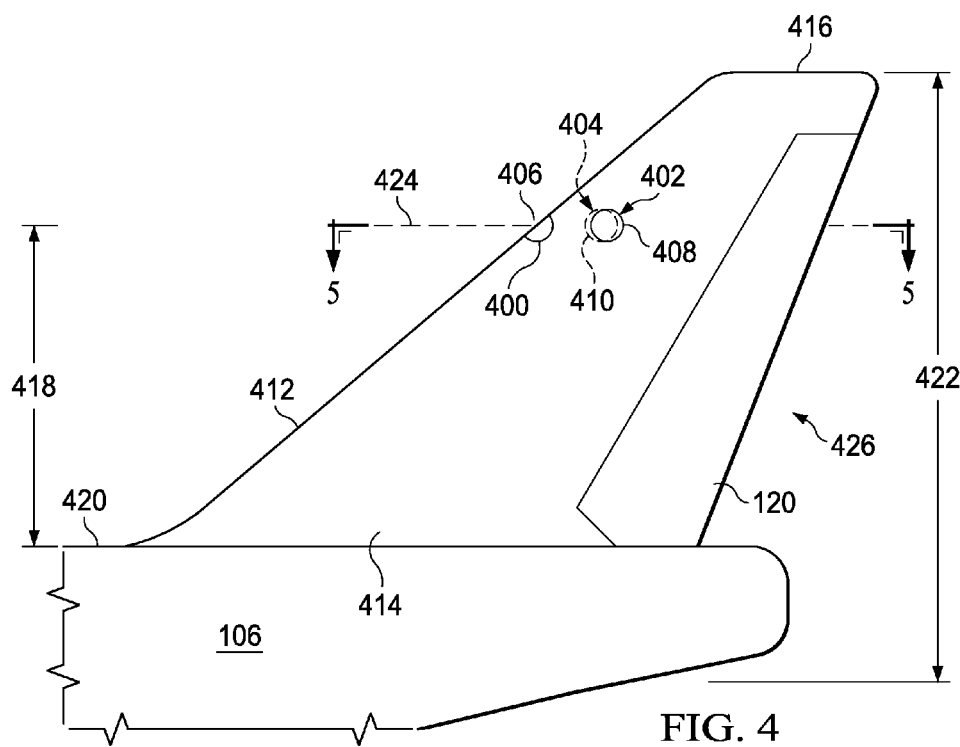
FIG. 4 is an illustration of sensors on a vertical stabilizer in accordance with an illustrative embodiment.

Turning next to FIG. 4, an illustration of sensors on a vertical stabilizer is depicted in accordance with an illustrative embodiment. An enlarged view of vertical stabilizer 120 in tail section 114 is illustrated. In this illustrative example, another configuration of sensors for detecting different types of icing conditions for aircraft 100 is depicted in accordance with an illustrative embodiment.

As depicted, first sensor 400, second sensor 402, and third sensor 404 are present on vertical stabilizer 120. First sensor 400 is in first location 406, second sensor 402 is in second location 408, and third sensor 404 is in third location 410. These sensors are examples of sensors that may be used in addition to or in place of the sensors shown in FIG. 1.

First sensor 400 in first location 406 is located on leading edge 412 of vertical stabilizer 120. Second sensor 402 in second location 408 is located on first side 414 of vertical stabilizer 120. Third sensor 404 in third location 410 is located on second side 416 of vertical stabilizer 120.

As illustrated, first location 406 for first sensor 400, second location 408 for second sensor 402, and third location 410 for third sensor 404 have height 418 above top 420 of fuselage 106. In this illustrative example, top 420 is where vertical stabilizer 120 is attached to fuselage 106 at leading edge 412 of vertical stabilizer 120. Height 418 may be the same or different for each of these locations.

In one illustrative example, height 418 may be selected to be about one half of height 422 of vertical stabilizer 120. Of course, height 418 may be selected in other ways so that the sensors are capable of detecting the different types of icing conditions.

In this illustrative example, second sensor 402 and third sensor 404 are located further aft of first sensor 400. As depicted, first sensor 400, second sensor 402, and third sensor 404 are located along line 424. Line 424 may be aligned with an axis extending centrally through fuselage 106, and line 424 may extend from first location 406 in a direction aft of leading edge 412 of vertical stabilizer 120 in these illustrative examples. The alignment of second sensor 402 in second location 408 and third sensor 404 in third location 410 may take the form of a chordwise surface distance aft of first location 406 of first sensor 400.

In this illustrative example, first sensor 400, second sensor 402, and third sensor 404 are part of ice detection assembly 426. For example, first sensor 400 is a sensor in first group of sensors 148, while second sensor 402 and third sensor 404 are sensors in second group of sensors 170 in FIG. 1.

As depicted, first sensor 400 is configured to detect the first type of icing condition for aircraft 100 in FIG. 1. Second sensor 402 and third sensor 404 are configured to detect the second type of icing condition for aircraft 100.

In these illustrative examples, the location of first sensor 400, second sensor 402, and third sensor 404 provides an ability to identify a location at which icing occurs during operation of aircraft 100. For example, if first sensor 400 detects ice, icing conditions may be identified at first location 406 along leading edge 412. If second sensor 402 detects ice, then icing conditions are identified as being present at second location 408 on first side 414 of vertical stabilizer 120. If third sensor 404 detects ice, then icing conditions are identified as being present at third location 410 on second side 416 of vertical stabilizer 120.

Further, detection of ice by first sensor 400 indicates that a first type of icing condition is present. In these illustrative examples, the first type of icing condition is a normal icing condition. Detection of ice by second sensor 402, third sensor 404, or both indicates a presence of a second type of icing condition. The second type of icing condition is a supercooled large drop icing condition in these illustrative examples.

More specifically, first location 406 for first sensor 400 is selected such that first drops for the first type of icing condition collide with first sensor 400. Second location 408 for second sensor 402 and third location 410 for third sensor 404 are selected such that second drops for the second type of icing condition collide with one or both of these sensors.

The combination of first sensor 400, second sensor 402, and third sensor 404 may reduce the effect of oscillations that aircraft 100 may have on detecting icing conditions. In other words, the locations of these sensors may reduce the effect of movement, such as, for example, pitch, yaw, or both, of aircraft 100 while detecting icing conditions.

The installation of first sensor 400, second sensor 402, and third sensor 404 on vertical stabilizer 120 may provide advantages over placing sensors on wing 102 or wing 104 of aircraft 100 in FIG. 1. For example, placing sensors on the leading edge of wing 102 or wing 104 of aircraft 100 may be complicated by the interaction of moveable control surfaces on the leading edges of these wings. Vertical stabilizer 120 does not include moveable control surfaces on leading edge 412.

Further, wiring for sensors in wing 102 or wing 104 of aircraft 100 may be complicated because of the presence of fuel tanks in these wings. Fuel tanks are typically not present within vertical stabilizer 120. As a result, increased complexity, design cost, and installation issues may be avoided through the placement of first sensor 400, second sensor 402, and third sensor 404 on vertical stabilizer 120.

Figure 5:
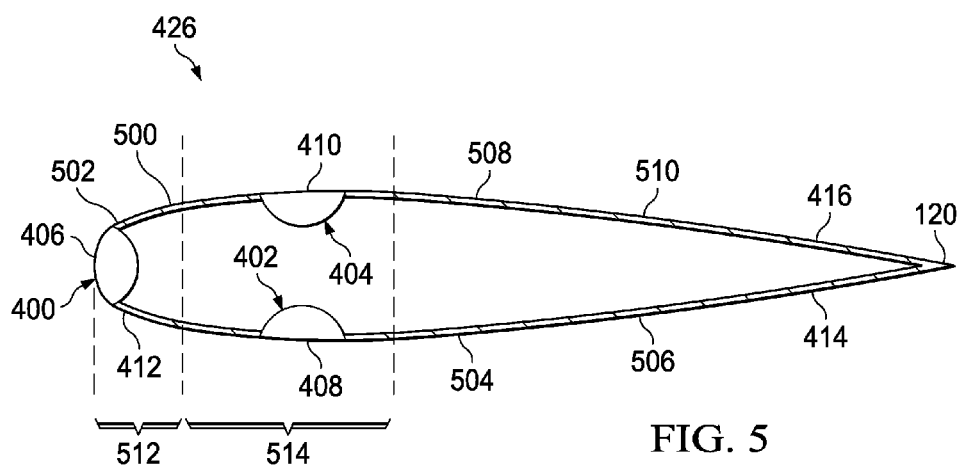
FIG. 5 is an illustration of a cross-sectional view of a vertical stabilizer with sensors in accordance with an illustrative embodiment.

Turning now to FIG. 5, an illustration of a cross-sectional view of a vertical stabilizer with sensors is depicted in accordance with an illustrative embodiment. A cross-sectional view of vertical stabilizer 120 taken along lines 5-5 in FIG. 4 is illustrated.

As can be seen in this illustrative example, first sensor 400 in first location 406 is mounted to be substantially flush to surface 500 of leading edge 412. Further, first sensor 400 has a shape that substantially conforms to curvature 502 of surface 500 at leading edge 412 of vertical stabilizer 120.

Second sensor 402 is substantially flush to first surface 504 on first side 414 of vertical stabilizer 120. Second sensor 402 has a shape that substantially conforms to curvature 506 of first surface 504 on first side 414 of vertical stabilizer 120.

In a similar fashion, third sensor 404 is substantially flush to second surface 508 on second side 416 of vertical stabilizer 120. Third sensor 404 also has a shape that substantially conforms to curvature 510 of second surface 508 on second side 416 of vertical stabilizer 120.

Further, first location 406 is in first region 512. First region 512 is a region in which first drops for the first type of icing condition collide with surface 500 of vertical stabilizer 120. Second location 408 is located on first surface 504 on first side 414 in second region 514 in which second drops for the second type of icing condition collide with first surface 504. Third location 410 is located on second surface 508 on second side 416 in second region 514 in which second drops for the second type of icing condition also may collide with second surface 508. These regions are similar to first region 308 and second region 310 as described in FIG. 3.

Figure 6:
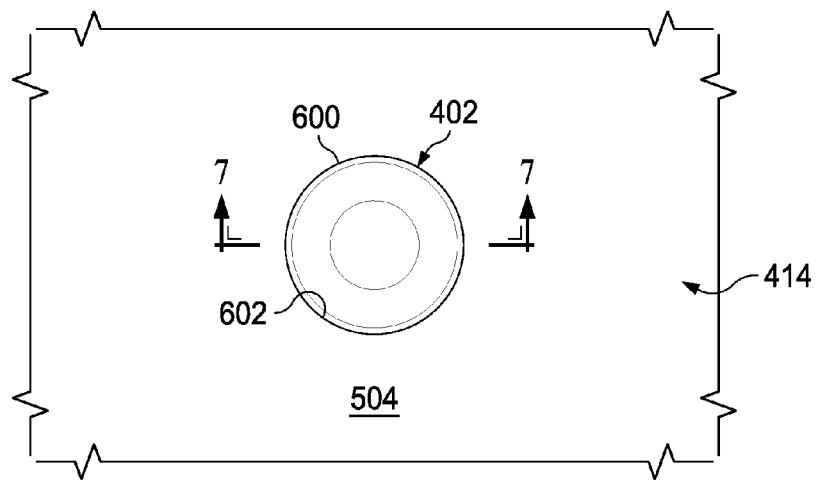
FIG. 6 is an illustration of a sensor in accordance with an illustrative embodiment.

With reference now to FIG. 6, an illustration of a sensor is depicted in accordance with an illustrative embodiment. In this view, a more-detailed illustration of second sensor 402 is shown.

Second sensor 402 includes housing 600. Housing 600 is designed to fit within opening 602 in first surface 504 of vertical stabilizer 120 in FIG. 1. Housing 600 is configured to have a shape that is substantially flush to first surface 504 when placed into opening 602. Further, the shape of housing 600 is such that housing 600 substantially conforms to curvature 506 in FIG. 5 of first surface 504.

Figure 7:
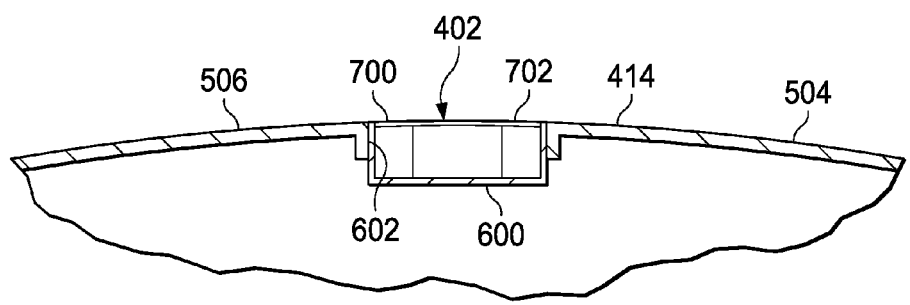
FIG. 7 is an illustration of a cross-sectional view of a sensor installed in a vertical stabilizer in accordance with an illustrative embodiment.

Turning now to FIG. 7, a cross-sectional view of a sensor installed in a vertical stabilizer is depicted in accordance with an illustrative embodiment. In this illustrative example, a cross-sectional view of second sensor 402 is seen taken along lines 7-7 in FIG. 6.

In this view, housing 600 is depicted such that surface 700 of housing 600 is substantially flush to first surface 504. In particular, surface 700 of housing 600 has curvature 702 such that surface 700 of housing 600 substantially conforms to curvature 506 of first surface 504.

The illustration of the sensors on vertical stabilizer 120 in FIGS. 4-7 are not meant to imply physical or architectural limitations to the manner in which other illustrative embodiments may be implemented. For example, one or more additional ice detection assemblies in addition to or in place of ice detection assembly 426 may be located on vertical stabilizer 120. In other illustrative examples, ice detection assembly 426 may be used in addition to or in place of the other sensors illustrated in FIG. 3. As another illustrative example, second sensor 402 in housing 600 may be used with other sensors illustrated in FIG. 1.

Figure 8:
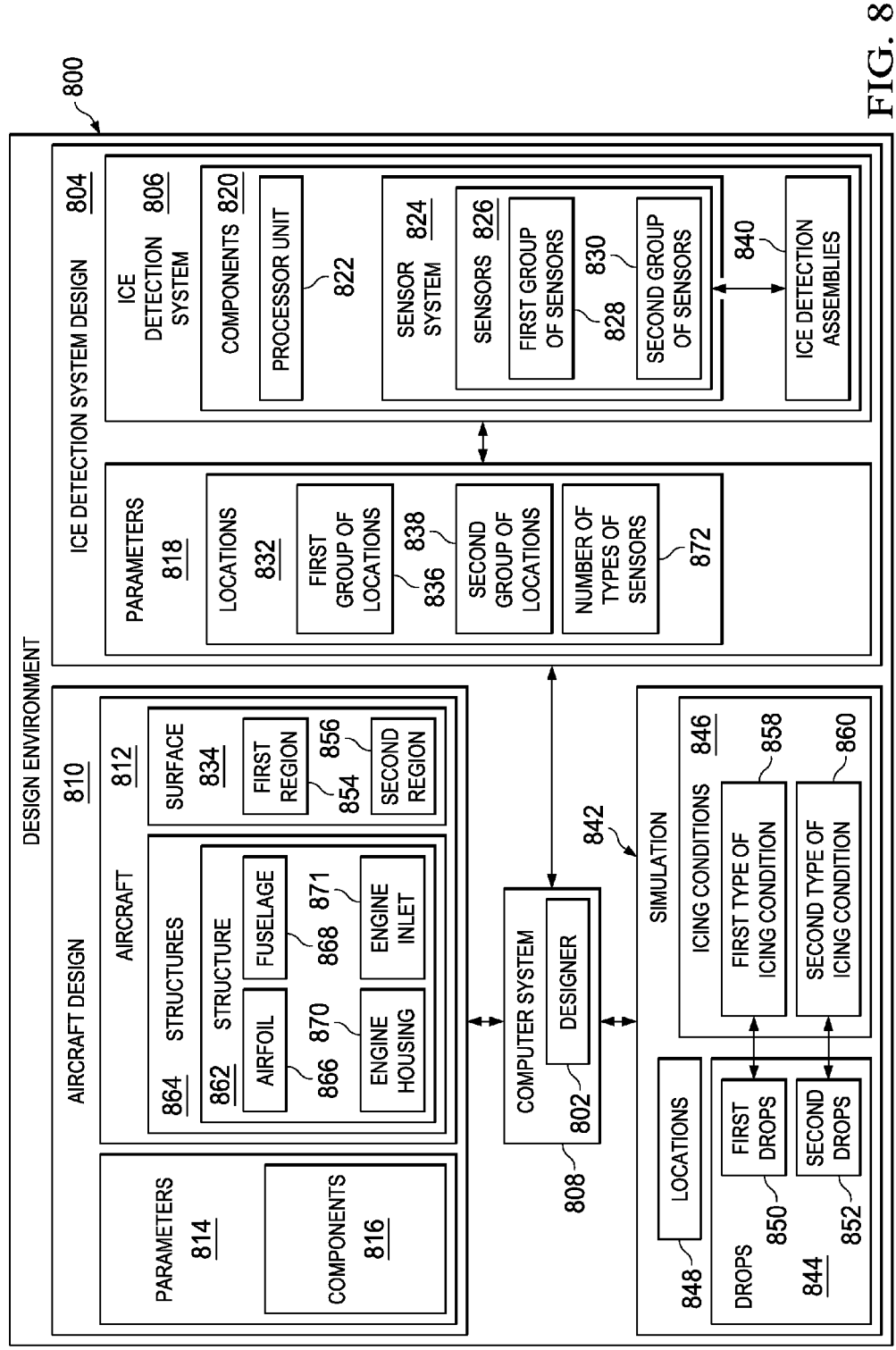
FIG. 8 is an illustration of a block diagram of a design environment in accordance with an illustrative embodiment.

Turning now to FIG. 8, an illustration of a block diagram of a design environment is depicted in accordance with an illustrative embodiment. Design environment 800 may be used to design an ice detection system for an aircraft in which the ice detection system is configured to detect a number of types of icing conditions. In this illustrative example, designer 802 may be implemented to generate ice detection system design 804 for ice detection system 806. Ice detection system 806 may be, for example, without limitation, ice detection system 122 in FIG. 1.

As illustrated, designer 802 may be implemented using software, hardware, or a combination of the two. In these illustrative examples, designer 802 may be implemented in computer system 808. Computer system 808 comprises a number of computers. When more than one computer is present in computer system 808, those computers may be in communication with each other. This communication may be facilitated using a communications medium, such as a network.

When designer 802 is implemented using software, designer 802 may take the form of program code that is configured to run on one or more computers. When hardware is employed, the hardware may include circuits that operate to perform the operations in designer 802.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being.

In this illustrative example, ice detection system design 804 may be generated using aircraft design 810 for aircraft 812. In other words, aircraft design 810 may be an input to designer 802 that is used to generate ice detection system 806. In particular, parameters 814 in aircraft design 810 for components 816 in aircraft 812 may be used to generate parameters 818 for ice detection system 806 in ice detection system design 804. Aircraft 812 may be, for example, aircraft 100 in FIG. 1.

In this illustrative example, parameters 818 in ice detection system design 804 are for components 820 in ice detection system 806. In these illustrative examples, components 820 in ice detection system 806 include processor unit 822 and sensor system 824.

Sensor system 824 comprises sensors 826. Sensors 826 include first group of sensors 828 and second group of sensors 830. In these illustrative examples, parameters 818 include locations 832 for sensors 826 in sensor system 824. In particular, locations 832 are locations on surface 834 of aircraft 812. Locations 832 may be defined using coordinates for aircraft 812.

In these illustrative examples, locations 832 include first group of locations 836 and second group of locations 838. First group of locations 836 is for first group of sensors 828. Second group of locations 838 is for second group of sensors 830. Additionally, first group of sensors 828 and second group of sensors 830 may be arranged in ice detection assemblies 840 in which a first sensor in first group of sensors 828 and a second sensor in second group of sensors 830 are in an ice detection assembly in ice detection assemblies 840.

Simulation 842 may be performed by computer system 808 to identify locations 832 for sensors 826. In these illustrative examples, simulation 842 may simulate drops 844 for icing conditions 846.

For example, simulation 842 may be performed to identify locations 848 on surface 834 of aircraft 812 where drops 844 will collide with surface 834 of aircraft 812. In these examples, drops 844 include first drops 850 and second drops 852. In this manner, simulation 842 may be used to identify first region 854 in which first drops 850 will collide with surface 834 and second region 856 in which second drops 852 will collide with surface 834 for different structures on aircraft 812. The identification of locations 848 in simulation 842 may be used to identify locations 832 for sensors 826.

In these illustrative examples, first group of locations 836 is selected such that first drops 850 in drops 844 for first type of icing condition 858 in icing conditions 846 collide with surface 834 in first group of locations 836. Second group of locations 838 is selected such that second drops 852 in drops 844 for second type of icing condition 860 in icing conditions 846 collide with surface 834 of aircraft 812 in second group of locations 838. In these illustrative examples, first drops 850 for first type of icing condition 858 may be normal supercooled drops. Second drops 852 for second type of icing condition 860 may be supercooled large drops in these illustrative examples.

In the depicted examples, first group of locations 836 may be within first region 854 on surface 834 of structure 862 in structures 864 in aircraft 812. Second group of locations 838 may be located in second region 856 on surface 834 of structure 862. In these illustrative examples, structure 862 in aircraft 812 may take the form of airfoil 866, fuselage 868, engine housing 870, engine inlet 871, and other suitable types of structures on aircraft 812.

Further, simulation 842 also may be used to select the number of sensors within sensors 826 in addition to locations 832 for sensors 826. Also, simulation 842 may be used to determine number of types of sensors 872 that may be used to implement sensors 826 in sensor system 824.

The illustration of design environment 800 in FIG. 8 is not meant to imply physical or architectural limitations to the manner in which an illustrative embodiment may be implemented. Other components in addition to and/or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, ice detection system design 804 may be used to identify additional locations in locations 832 for sensors 826 to detect one or more additional types of icing conditions in addition to first type of icing condition 858 and second type of icing condition 860.

In still other illustrative examples, designer 802 may be used to modify ice detection system design 804 instead of creating ice detection system design 804. For example, ice detection system design 804 may already include first group of sensors 828 in first group of locations 836. Ice detection system design 804 may be modified to identify second group of locations 838 for second group of sensors 830. In this manner, designer 802 may be used to identify modifications to existing ice detection systems in these illustrative examples. In still other illustrative examples, ice detection system design 804 may be part of aircraft design 810 instead of a separate design.

The different components illustrated in FIGS. 1-7 may be combined with components shown in FIG. 8, used with components in FIG. 8, or a combination of the two. Additionally, some of the components illustrated in FIGS. 1-7 may be examples of how components shown in block form in FIG. 8 may be implemented as physical structures.

Figure 9:
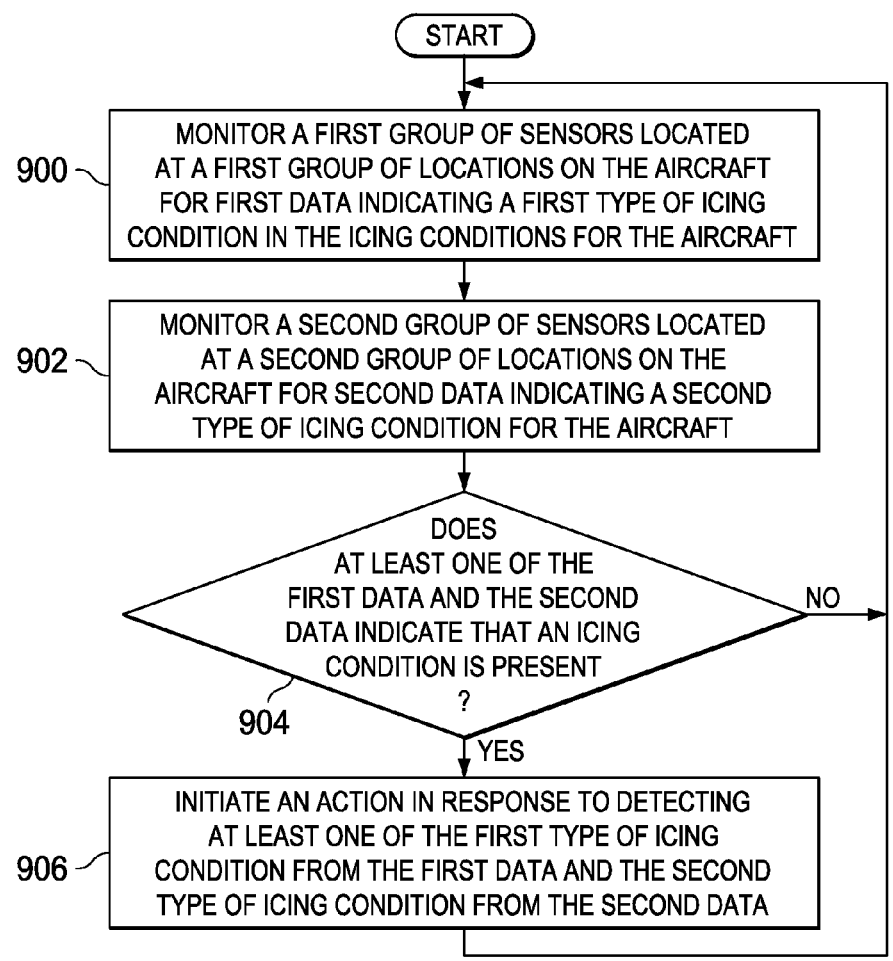
FIG. 9 is an illustration of a flowchart of a process for detecting icing conditions for an aircraft in accordance with an illustrative embodiment.

With reference now to FIG. 9, an illustration of a flowchart of a process for detecting icing conditions for an aircraft is depicted in accordance with an illustrative embodiment. The process illustrated in FIG. 9 may be implemented in an ice detection system, such as ice detection system 806 as specified by ice detection system design 804 in FIG. 8. Further, the process may be implemented in ice detection system 122 for aircraft 100 in FIG. 1. In particular, one or more operations performed in this flowchart may be implemented using processor unit 200 in FIG. 2.

The process begins by monitoring a first group of sensors located at a first group of locations on the aircraft for first data indicating a first type of icing condition in the icing conditions for the aircraft (operation 900). The first group of sensors in operation 900 may be first group of sensors 148 in ice detection system 122 in FIG. 1. The process then monitors a second group of sensors located at a second group of locations on the aircraft for second data indicating a second type of icing condition for the aircraft (operation 902). The second group of sensors in operation 902 may be second group of sensors 170 in ice detection system 122 in FIG. 1.

A determination is made as to whether at least one of the first data and the second data indicates that an icing condition is present (operation 904). If an icing condition is not present, the process returns to operation 900 as described above. Otherwise, the process initiates an action in response to detecting at least one of the first type of icing condition from the first data and the second type of icing condition from the second data (operation 906), with the process then returning to operation 900 as described above.

Figure 10:
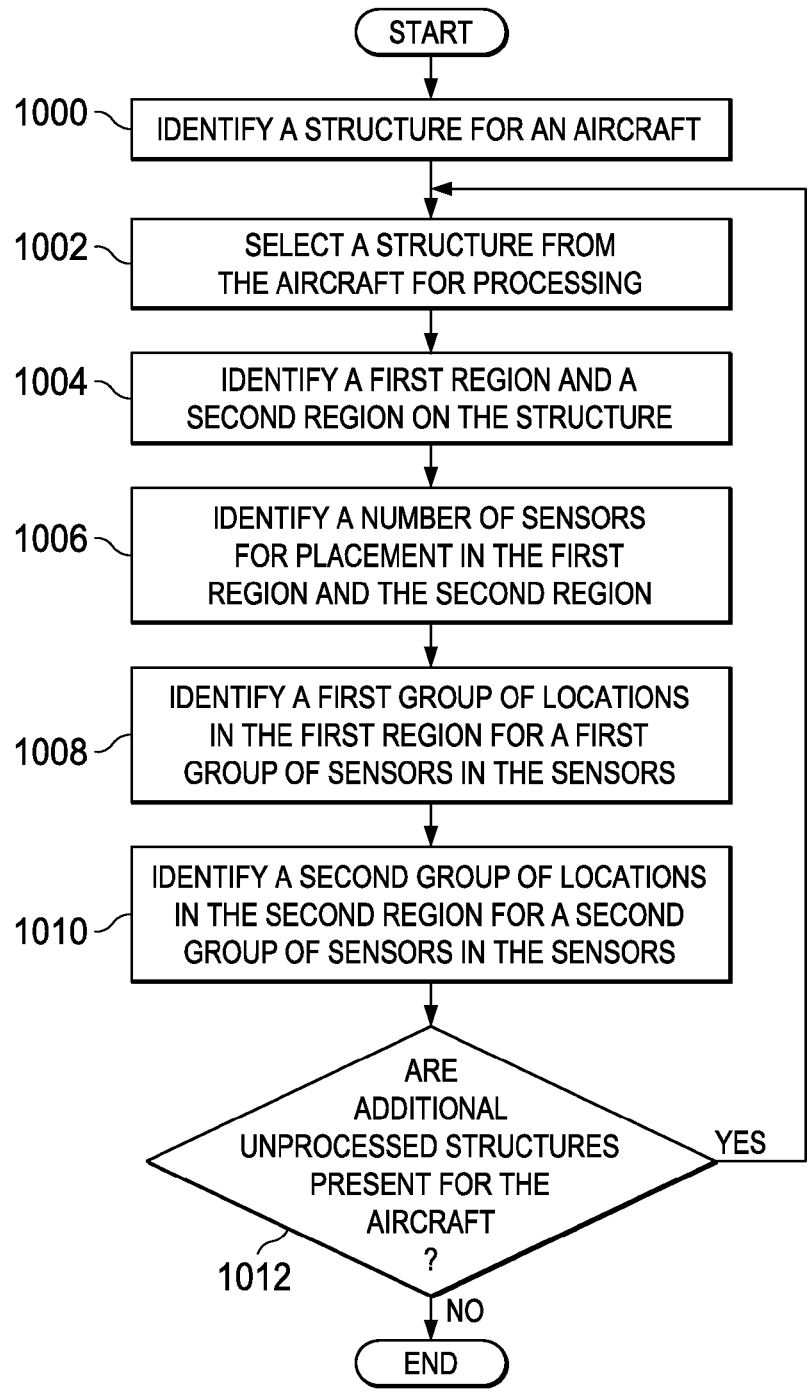
FIG. 10 is an illustration of a flowchart of a process for designing an ice detection system in accordance with an illustrative embodiment.

With reference now to FIG. 10, an illustration of a flowchart of a process for designing an ice detection system is depicted in accordance with an illustrative embodiment. The process illustrated in FIG. 10 may be implemented in design environment 800 in FIG. 8. In particular, the process may be implemented using designer 802 in FIG. 8.

The process begins by identifying a structure for an aircraft (operation 1000). These structures may be any structure on which ice may form when one or more types of icing conditions are present. The process then selects a structure from the aircraft for processing (operation 1002).

The process then identifies a first region and a second region on the structure (operation 1004). The first region is a region in which first drops for a first type of icing condition collide with the surface of the aircraft. The second region is a region in which second drops for a second type of icing condition collide with the surface of the aircraft. The process then identifies a number of sensors for placement in the first region and the second region (operation 1006). In some cases, sensors may be absent from one region on the structure, depending on the implementation.

The process then identifies a first group of locations in the first region for a first group of sensors in the sensors (operation 1008). The process then identifies a second group of locations in the second region for a second group of sensors in the sensors (operation 1010). A determination is made as to whether additional unprocessed structures are present for the aircraft (operation 1012). If additional unprocessed structures are present, the process returns to operation 1002 as described above. Otherwise, the process terminates. When the process is completed, the design for the ice detection system may be finished and ready for implementation.

The flowcharts and block diagrams in the different depicted embodiments illustrate the architecture, functionality, and operation of some possible implementations of apparatuses, methods, and computer program products. In this regard, each block in the flowcharts or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Figure 11:
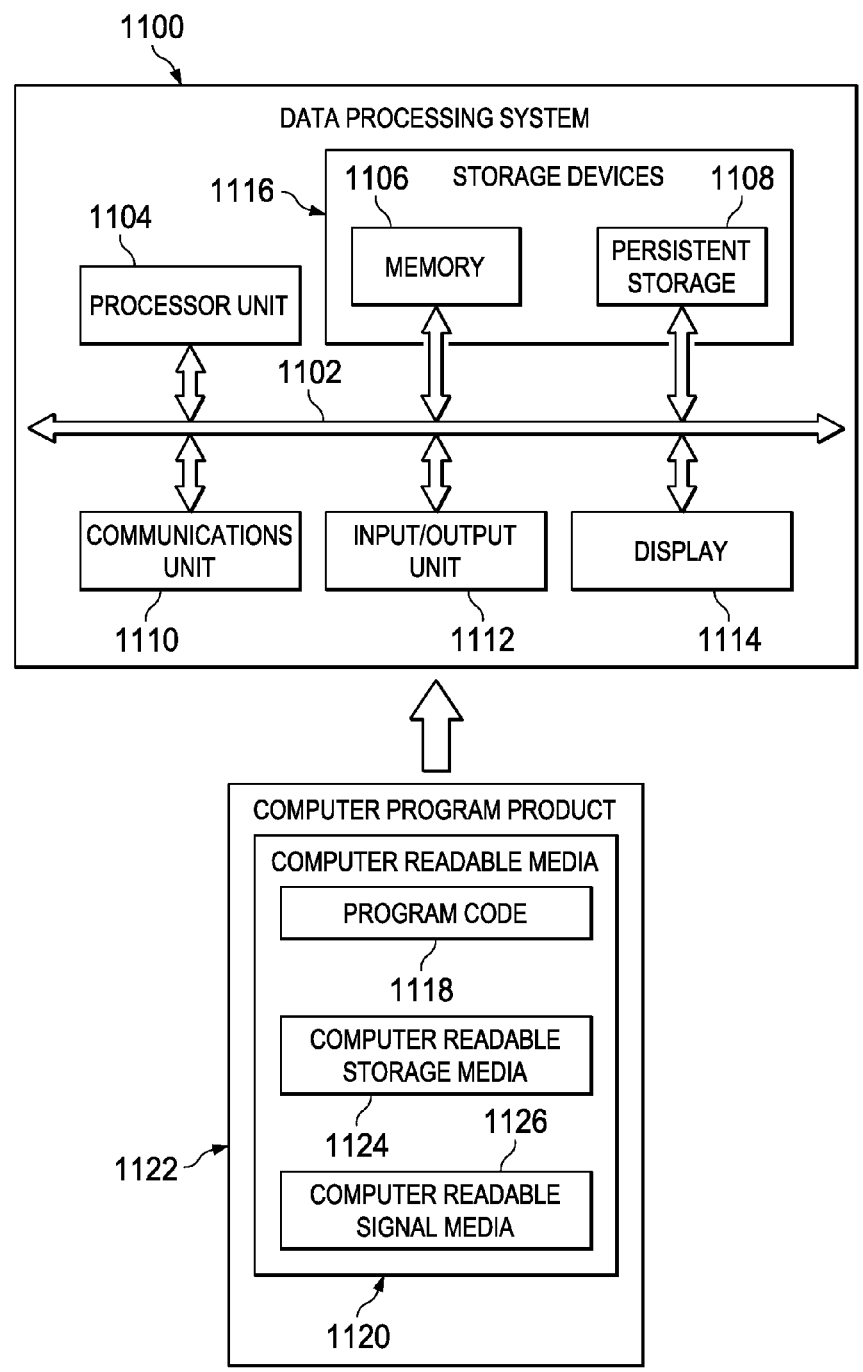
FIG. 11 is an illustration of a data processing system in accordance with an illustrative embodiment.

Turning now to FIG. 11, an illustration of a data processing system is depicted in accordance with an illustrative embodiment. Data processing system 1100 may be used to implement flight management system 208 in FIG. 2, computer system 808 in FIG. 8, and other computers that may be used in different illustrative embodiments. In this illustrative example, data processing system 1100 includes communications framework 1102, which provides communications between processor unit 1104, memory 1106, persistent storage 1108, communications unit 1110, input/output (I/O) unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation. In these illustrative examples, processor unit 1104 is an example of a processor unit that may be used to implement processor unit 200 in FIG. 2.

Memory 1106 and persistent storage 1108 are examples of storage devices 1116. A storage device is any piece of hardware that is capable of storing information, such as, for example, without limitation, data, program code in functional form, and other suitable information either on a temporary basis or a permanent basis. Storage devices 1116 also may be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through a keyboard, a mouse, and/or some other suitable input device. Further, input/output unit 1112 may send output to a printer. Display 1114 provides a mechanism to display information to a user.

Instructions for the operating system, applications, and/or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer readable program code that may be read and executed by a processor in processor unit 1104. The program code in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these illustrative examples. In one example, computer readable media 1120 may be computer readable storage media 1124 or computer readable signal media 1126.

In these illustrative examples, computer readable storage media 1124 is a physical or tangible storage device used to store program code 1118 rather than a medium that propagates or transmits program code 1118. Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 1100 are not meant to provide physical or architectural limitations to the manner in which different embodiments may be implemented. The different illustrative embodiments may be implemented in a data processing system including components in addition to and/or in place of those illustrated for data processing system 1100. Other components shown in FIG. 11 can be varied from the illustrative examples shown. The different embodiments may be implemented using any hardware device or system capable of running program code 1118.

Figure 12:
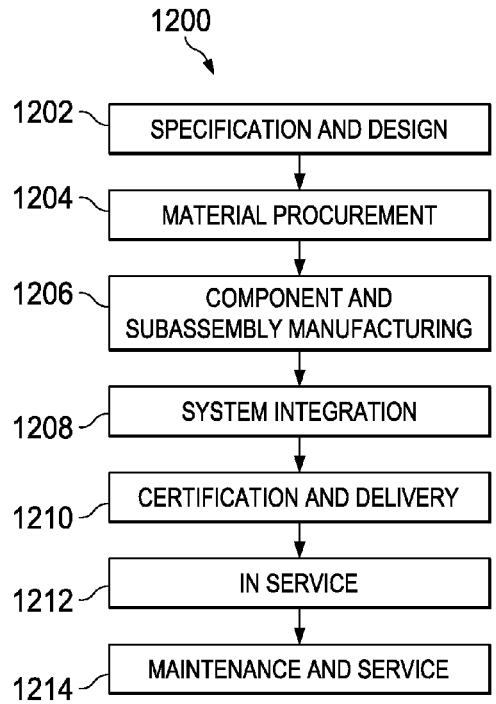
FIG. 12 is an illustration of an aircraft manufacturing and service method in accordance with an illustrative embodiment.
Figure 13:
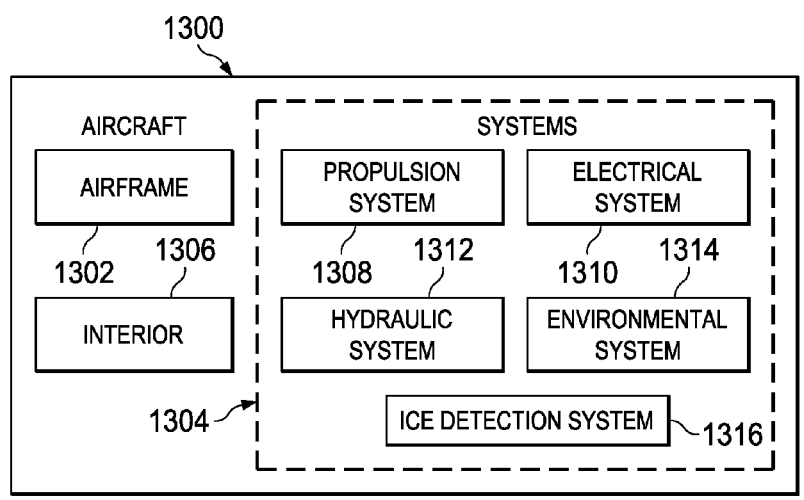
FIG. 13 is an illustration of an aircraft in which an illustrative embodiment may be implemented.

Illustrative embodiments of the disclosure may be described in the context of aircraft manufacturing and service method 1200 as shown in FIG. 12 and aircraft 1300 as shown in FIG. 13. Turning first to FIG. 12, an illustration of an aircraft manufacturing and service method is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for routine maintenance and service 1214, which may include modification, reconfiguration, refurbishment, and other maintenance or service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft is depicted in which an illustrative embodiment may be implemented. In this example, aircraft 1300 is produced by aircraft manufacturing and service method 1200 in FIG. 12 and may include airframe 1302 with plurality of systems 1304 and interior 1306. Examples of systems 1304 include one or more of propulsion system 1308, electrical system 1310, hydraulic system 1312, environmental system 1314, and ice detection system 1316. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1200 in FIG. 12. In one illustrative example, components or subassemblies produced in component and subassembly manufacturing 1206 may be fabricated or manufactured in a manner similar to components or subassemblies produced while aircraft 1300 is in service 1212.

As yet another example, one or more apparatus embodiments, method embodiments, or a combination thereof may be utilized during different stages of aircraft manufacturing and service method 1200. For example, ice detection system 1316 may be designed during specification and design 1202. Components for ice detection system 1316 may be manufactured during component and subassembly manufacturing 1206. Ice detection system 1316 may be installed in aircraft 1300 during system integration 1208. Ice detection system 1316 may be used while aircraft 1300 is in service 1212.

In another illustrative example, ice detection system 1316 may be an existing ice detection system in aircraft 1300. Upgrades, modifications, and other operations may be performed to modify ice detection system 1316 on aircraft 1300 to include features in accordance with an illustrative embodiment.

Thus, one or more illustrative embodiments provide a method and apparatus for identifying different types of icing conditions. In particular, an illustrative embodiment provides an ability to identify a first type of icing condition and a second type of icing condition. The first type of icing condition may be one typically encountered, while the second type of icing condition may be a supercooled large drop icing condition. In these illustrative examples, the ability to identify more than one type of icing condition may allow an aircraft to be certified for flight in different types of icing conditions under various regulations that may be present from government or other regulatory entities, such as the Federal Aviation Administration.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An ice detection system comprising:
   a first sensor located on a leading edge of a vertical stabilizer on an aircraft, wherein the first sensor is configured to detect a first type of icing condition for the aircraft, and wherein the first sensor is located at a first height above a fuselage of the aircraft;
   a second sensor located on a first side of the vertical stabilizer, wherein the second sensor is configured to detect a second type of icing condition for the aircraft, wherein the second sensor is substantially flush to a first surface on the first side of the vertical stabilizer, and wherein the second sensor is located at a second height different from the first height above the fuselage of the aircraft; and a third sensor located on a second side of the vertical stabilizer, wherein the third sensor is configured to detect the second type of icing condition for the aircraft.

2. The ice detection system of claim 1, wherein the first sensor, the second sensor, and the third sensor generate data and further comprising:

a processor unit configured to monitor the data from the first sensor, the second sensor, and the third sensor and perform an action in response to the data indicating a presence of at least one of the first type of icing condition or the second type of icing condition.

3. The ice detection system of claim 1, wherein the first sensor is substantially flush to a surface of the leading edge of the vertical stabilizer and has a shape that substantially conforms to a curvature of the leading edge of the vertical stabilizer.

4. The ice detection system of claim 1, wherein the second sensor has a first shape that substantially conforms to a curvature of the first side and the third sensor is substantially flush to a second surface on the second side of the vertical stabilizer and has a second shape that substantially conforms to a curvature of the second side.

5. The ice detection system of claim 1, wherein a first location of the first sensor on the leading edge is configured to expose the first sensor to first drops of water for the first type of icing condition and wherein a second location of the second sensor on the first side and a third location of the third sensor on the second side are configured to expose the second sensor and the third sensor to second drops of water for the second type of icing condition.

6. The ice detection system of claim 5, wherein the first location is the first height above the fuselage of the aircraft, the second location is the second height above the fuselage of the aircraft, and the third location is a third height above the fuselage of the aircraft.

7. The ice detection system of claim 5, wherein the second location and the third location are located along a line extending from the first location in a direction aft of the leading edge of the vertical stabilizer.

8. The ice detection system of claim 1, wherein the first type of icing condition is caused by first drops having a first number of sizes, the second type of icing condition is caused by second drops having a second number of sizes, and the first number of sizes is smaller than the second number of sizes.

9. The ice detection system of claim 1, wherein the second type of icing condition is a supercooled large drop type of icing condition.

10. The ice detection system of claim 2, wherein the action is selected from at least one of generating an alert, generating a log entry, activating an anti-icing system, or sending a report.

11. The ice detection system of claim 1, wherein the first sensor, the second sensor, and the third sensor are configured to detect a presence of ice.

12. The ice detection system of claim 1, wherein the aircraft is selected from one of a commercial aircraft, a military aircraft, an airplane, or a helicopter.

13. An ice detection system comprising:

a first sensor located on a leading edge of a vertical stabilizer on an aircraft, wherein the first sensor is in a first location configured to detect a normal icing condition for the aircraft, wherein the first location is at a first height above a fuselage of the aircraft;

a second sensor located on a first side of the vertical stabilizer, wherein the second sensor is in a second location configured to detect a supercooled large drop type of icing condition for the aircraft, wherein the second sensor is substantially flush to a first surface on the first side of the vertical stabilizer, and wherein the second location is at a second height different from the first height above the fuselage of the aircraft;

a third sensor located on a second side of the vertical stabilizer, wherein the second side is opposite of the first side and wherein the third sensor is in a third location configured to detect the supercooled large drop type of icing condition for the aircraft; and a processor unit configured to monitor data from the first sensor, the second sensor, and the third sensor and perform an action in response to the data indicating a presence of at least one of the normal icing condition and the supercooled large drop type of icing condition.

14. The ice detection system of claim 13, wherein the first sensor is substantially flush to a surface of the leading edge and has a shape that substantially conforms to a curvature of the leading edge of the vertical stabilizer.

15. The ice detection system of claim 14, wherein the second sensor has a first shape that substantially conforms to a curvature of the first side and the third sensor is substantially flush to a second surface on the second side of the vertical stabilizer and has a second shape that substantially conforms to a curvature of the second side.

16. The ice detection system of claim 15, wherein the third location is a third height above the fuselage of the aircraft and wherein the second location and the third location are located along a line extending from the first location in a direction aft of the leading edge of the vertical stabilizer.

17. The ice detection system of claim 13, wherein the action is selected from at least one of generating an alert, generating a log entry, activating an anti-icing system, and sending a report.

18. A method for detecting icing conditions, the method comprising:

monitoring a first sensor located on a leading edge of a vertical stabilizer at a first height above a fuselage of an aircraft for first data indicating a first type of icing condition for the aircraft;

monitoring a second sensor located on a first side of the vertical stabilizer and a third sensor located on a second side of the vertical stabilizer for second data indicating a second type of icing condition for the aircraft, wherein the second sensor is substantially flush to a first surface on the first side of the vertical stabilizer and has a first shape that substantially conforms to a curvature of the first side, and wherein the second sensor is located at a second height different from the first height above the fuselage of the aircraft; and initiating an action in response to detecting at least one of the first type of icing condition from the first data and the second type of icing condition from the second data.

19. The method of claim 18 further comprising:

responsive to detecting at the least one of the first type of icing condition from the first data or the second type of icing condition from the second data, identifying a location on the aircraft in which the at least one of the first type of icing condition or the second type of icing condition is detected.

20. The method of claim 18, wherein initiating the action in response to detecting the at least one of the first type of icing condition from the first data or the second type of icing condition from the second data comprises:

initiating the action in response to detecting the at least one of the first type of icing condition from the first data and the second type of icing condition from the second data, wherein the action is selected from at least one of generating an alert, generating a log entry, activating an anti-icing system, or sending a report.

* * * * *